United States Patent
McNally et al.

(10) Patent No.: US 6,823,513 B1
(45) Date of Patent: Nov. 23, 2004

(54) WORKFLOW DISTRIBUTION PROCESS GRANTING TO OPERATORS WITH ASSIGNED ACTIVITIES ACCESS TO NEEDED COMPUTER RESOURCES AND WITHDRAWING SUCH ACCESS UPON THE COMPLETION OF THE ASSIGNED ACTIVITY

(75) Inventors: Michael R. McNally, Austin, TX (US); John William Sweitzer, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/561,186

(22) Filed: Apr. 27, 2000

(51) Int. Cl.[7] .................................................. G06F 9/46
(52) U.S. Cl. ....................................... 718/104; 713/200
(58) Field of Search ................................. 718/100, 104; 713/200, 201, 150, 151; 704/101, 104, 203; 700/101; 705/8, 9

(56) References Cited

U.S. PATENT DOCUMENTS

| | | | | |
|---|---|---|---|---|
| 5,752,031 A | * | 5/1998 | Cutler et al. ............... | 718/103 |
| 5,754,857 A | * | 5/1998 | Gadol ........................ | 709/203 |
| 5,774,661 A | * | 6/1998 | Chatterjee et al. ......... | 709/203 |
| 5,790,868 A | * | 8/1998 | Hotea et al. ............... | 710/200 |
| 5,918,226 A | * | 6/1999 | Tarumi et al. .............. | 707/10 |
| 5,937,388 A | * | 8/1999 | Davis et al. ................ | 705/8 |
| 5,940,804 A | * | 8/1999 | Turley et al. ............... | 705/9 |
| 5,999,911 A | * | 12/1999 | Berg et al. ................. | 705/9 |
| 6,055,637 A | * | 4/2000 | Hudson et al. ............ | 713/201 |
| 6,058,413 A | * | 5/2000 | Flores et al. .............. | 709/101 |
| 6,088,679 A | * | 7/2000 | Barkley ..................... | 705/8 |
| 6,151,583 A | * | 11/2000 | Ohmura et al. ............ | 705/8 |
| 6,349,238 B1 | * | 2/2002 | Gabbita et al. ............ | 700/101 |
| 6,493,675 B1 | * | 12/2002 | Kanaya et al. ............. | 705/7 |
| 6,631,354 B1 | * | 10/2003 | Leymann et al. .......... | 705/8 |

* cited by examiner

*Primary Examiner*—St. John Courtenay, III
*Assistant Examiner*—Van Hoa Nguyen
(74) *Attorney, Agent, or Firm*—J. B. Kraft; Leslie A. Van Leeuwen

(57) ABSTRACT

A method for limiting access of each of a plurality of operators having assigned activities in an overall workflow distribution, to computer resources needed to respectively complete each activity through a computer controlled interactive display interface. A workflow distribution process with a plurality of users or participants at a plurality of computer controlled display stations. At the workflow management source, an implementation for respectively assigning activities to each of a plurality of operators and for designating for each of the activities, at least one computer resource necessary to respectively complete each of the activities. A set of elements, each representing a designated computer resource accessible to a user to carry out an assigned activity is displayed. An implementation for determining the completion of each of the assigned activities, and for removing from the display the elements representing the designated computer resources when an activity is completed.

15 Claims, 11 Drawing Sheets

| PROJECT DOG WORKFLOW | R1 | R2 | R3 | R4 | | | | | Rn | |
|---|---|---|---|---|---|---|---|---|---|---|
| ACTIVITY | TYPE | | | | DESCRIPTION | | | | STATUS | |
| A | COM | | | | GLOBAL ASSESSMENT | | | | INITIAL | |
| B | COM | | | | CAPACITY ASSESSMENT | | | | COMPLETED | |
| C | COM | | | | COST ASSESSMENT | | | | INITIAL | |

FIG. 8

WORKFLOW DISTRIBUTION PROCESS GRANTING TO OPERATORS WITH ASSIGNED ACTIVITIES ACCESS TO NEEDED COMPUTER RESOURCES AND WITHDRAWING SUCH ACCESS UPON THE COMPLETION OF THE ASSIGNED ACTIVITY

CROSS-REFERENCE TO RELATED COPENDING PATENT APPLICATIONS

The following patent application, having the same inventorship, assigned to the assignee of the present invention and filed concurrently herewith, covers subject matter related to the subject matter of the present invention: "A SYSTEM FOR ASSIGNING DATA PROCESSING ACTIVITIES TO USERS THROUGH AN INTERACTIVE DISPLAY INTERFACE DYNAMICALLY GRANTING ACCESS ONLY DURING ACTIVITY TO NORMALLY INACCESSIBLE RESOURCES NEEDED FOR ACTIVITY", Ser. No. 09/561,185.

TECHNICAL FIELD

The present invention relates to workflow management and distribution processes systems and particularly to the protection of the computer resources used in executing and carrying out the various workflow activities assigned to the participants or operators in the overall process.

BACKGROUND OF RELATED ART

The 1990's have been marked by a technological revolution driven by the convergence of the data processing industry with the consumer electronics industry. The effect has, in turn, driven technologies which have been known and available but relatively quiescent over the years. A major one of these technologies is the Internet or World Wide Web (Web) related distribution of documents, programs, media and all other data processing entities. The convergence of the electronic entertainment and consumer industries with data processing exponentially accelerated the demand for wide ranging communication distribution channels and the Web or Internet, which had quietly existed for over a generation as a loose academic and government data distribution facility, reached "critical mass" and commenced a period of phenomenal expansion.

As a result of this expansion, extraordinary worldwide communication channels and resources have become available to businesses, and this has commenced an era which should forever change how business processes are conducted.

The era is marked by what may be referred to as "virtual enterprises", i.e. businesses relying on workflow distribution processes to conduct their business. Conventionally, business processes have been carried out completely within the limits of a company. The processes begin and are completed within the company boundaries. External requests came into the company as faxes, phone calls, postal mail and even electronic mail. These requests are then forwarded to appropriate personnel who initiate the internal process to handle the request. When the appropriate business processes are completed, the final actions are taken, such as shipping the goods out of the company, followed by appropriate phone calls, mail or faxes from the shipping company. Status inquiries were handled by internal people.

However, globalization has driven businesses away from these more leisurely methods of doing business. Now, with the Internet and like wide area networks, the business processes of customers and suppliers routinely interact with a minimum of human intervention. These interactions may range from simple inquiries to complex interactions between companies to situations where organizational units of different companies are related by sharing data and business processes so that they operate like independent or virtual enterprises. The companies no longer have to use phone calls or mail orders to do business with each other. Through the use of networks such as the Internet, business processes of different companies handle each others' requests without any manual intervention; no interaction is required to a have one business process talk to another business process of a different company.

However, this collaboration between different organizations and companies requires the sharing of resources such as business processes and databases. Basically, the interaction between two or more businesses may be reduced to a business process where each activity in the process is performed by a participating company. Each participating company has to make available to one or more of the others, the databases and other resources which the others may need to complete their activity. In present practice, the Internet or like network provides the communication backbone for running the processes and accessing the databases and other resources.

These collaborative processes are computer controlled and are called workflow processes or workflow distribution processes. For the present state of the workflow distribution art, reference may be made to the text, *Production Workflow. Concepts and Techniques*, Frank Leymann et al., published 2000, Prentice Hall, N.J.

While workflow distribution processes have been very successful in accelerating the business processes and production, the sharing of data, business processes and other resources between participants, which are likely to be different companies, has presented extensive proprietary data and resource security problems. Many of the participants cooperating on one workflow process are likely to either be competitors or associated with competitors in many other business areas.

Consequently, there is a continuing need in the field of workflow distribution processes for systems and methods for limiting access of workflow process participants to resources which are proprietary to other participants. In addition, because the activities to be carried out are often distributed to a wide variety of people of different business and technical backgrounds, and perhaps nationalities, the access limitations must be presented to the users or activity operators through an easy user-intuitive interface.

SUMMARY OF THE PRESENT INVENTION

The present invention provides a method and system for limiting access to resources to each of a plurality of operators having assigned activities in an overall workflow distribution, to computer resources needed to respectively complete each activity through a computer controlled interactive display interface which is easy to use and intuitive yet minimizes the risk of loss of resources which are proprietary to the provider of the resource.

In a workflow distribution process with a plurality of users or participants, which we will refer to as operators at a plurality of computer controlled display stations, there is provided at the workflow management source, means for respectively assigning activities to each of a plurality of operators and means for designating for each of said activities at least one computer resource necessary to respectively complete each of said activities.

Then, there is displayed to each of the operators at their respective display stations, a set of elements, each representing a designated computer resource accessible to said operator to carry out said assigned activity. In order that the operator does not have access to the resources designated to complete an assigned activity for any time beyond the completion of the activity, there is provided means for determining the completion of each of said assigned activities, and means responsive to this determining means for removing from the display the elements representing the designated computer resources for each respective activity responsive to a determination that said respective activity is completed.

In addition, there may be provided to each of said operators access to a plurality of basic computer resources without limitation to any assigned activity so that the present computer resources made accessible to operators for carrying out said assigned activities boost the basic resources already provided to the respective operators. This basic set of resources is available to the operator irrespective of any assigned activities, and is displayed as a basic set of elements each representing a basic computer resource selectively accessible by said operator. If in executing his assigned activity, the operator finds that he needs access to an additional resource, he may, through his display interface, request access to an additional computer resource prior to the completion of an assigned activity. Means are provided for designating such additional access by adding an element representative of said additional resource to the designated set of elements.

BRIEF DESCRIPTION OF THE DRAWINGS

The present invention will be better understood and its numerous objects and advantages will become more apparent to those skilled in the art by reference to the following drawings, in conjunction with the accompanying specification, in which:

FIG. 8 is the display screen of FIG. 7, after the operator has completed the execution of the assigned activity;

DETAILED DESCRIPTION OF THE PREFERRED EMBODIMENT

Figure 1:
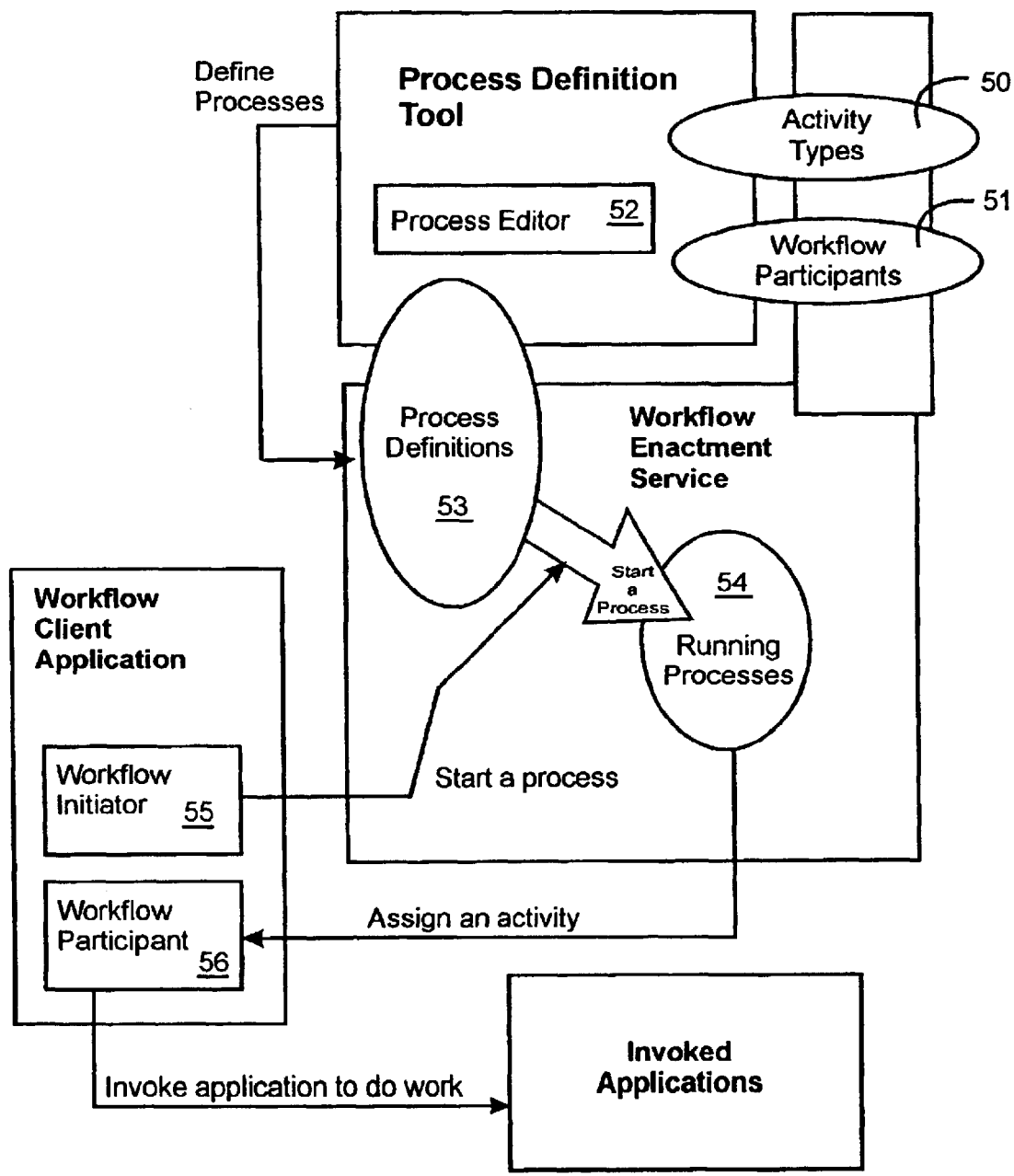
FIG. 1 is a generalized flow diagram of a typical workflow distribution system which is modifiable to practice the process of the present invention.

By way of background, FIG. 1 shows the development and running of a typical workflow distribution process. It consists of three primary aspects: 1) the build time during which the developer or editor 52 determines the activity types 50 which must be done to implement the process, as well as the workflow participants 51 who will be carrying out the various activity types. As will be hereinafter described, the developer uses process definition tools made available to him through a computer display graphical user interface. 2) The resulting process definitions 53 are stored in a workflow enactment or management service usually in connection with a server computer which will control the workflow distribution in accordance with the process definitions. 3) The workflow at run time is commenced from a workflow client application through a workflow initiator 55 which starts the process and commences the running of processes 54 under the control of the workflow enactment service. The running processes assign activities to the workflow participants 56 which in turn invoke the appropriate applications to do the work required by the activities.

Figure 2:
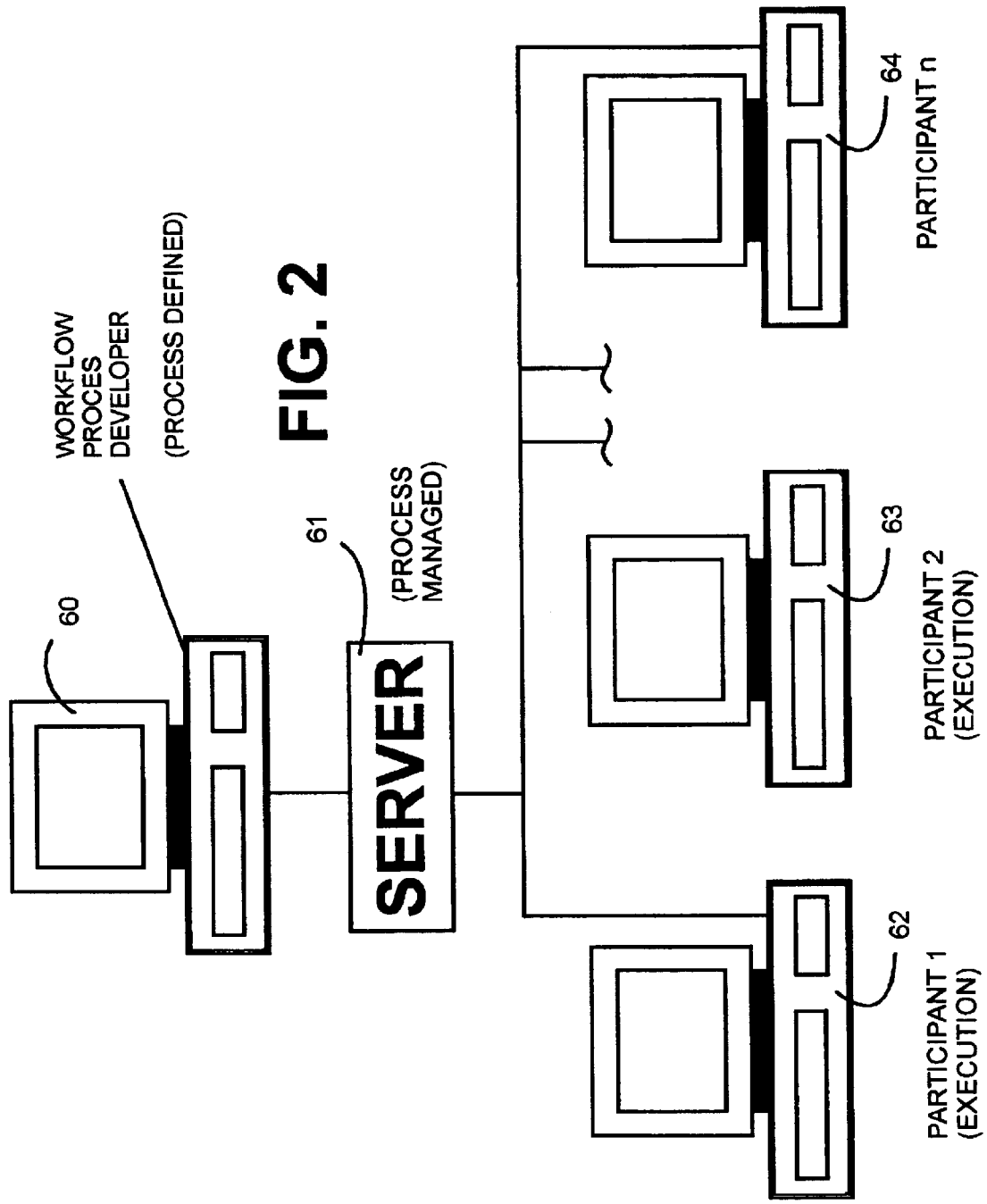
FIG. 2 is a generalized network setup on which the workflow distribution system of FIG. 1 may be carried out and including the process of the present invention.

FIG. 2 is a generalized network setup on which the workflow distribution system of FIG. 1 may be carried out and includes the process of the present invention. A workflow process developer may define the process through the display interface of a workstation 60. The process definitions may be stored in association with server 61 through which the workflow process may be managed. The activities are assigned to participants or operators through a group of network receiving display stations 62, 63 and 64, through which the participants 1 through n respectively execute their activities. The network shown in FIG. 2 may be the Internet with the developer developing the various workflow processes at a sending or source terminal, and the workflow activities being distributed through managing servers to the participants at client display stations on the Internet who execute such assigned activities.

Figure 3:
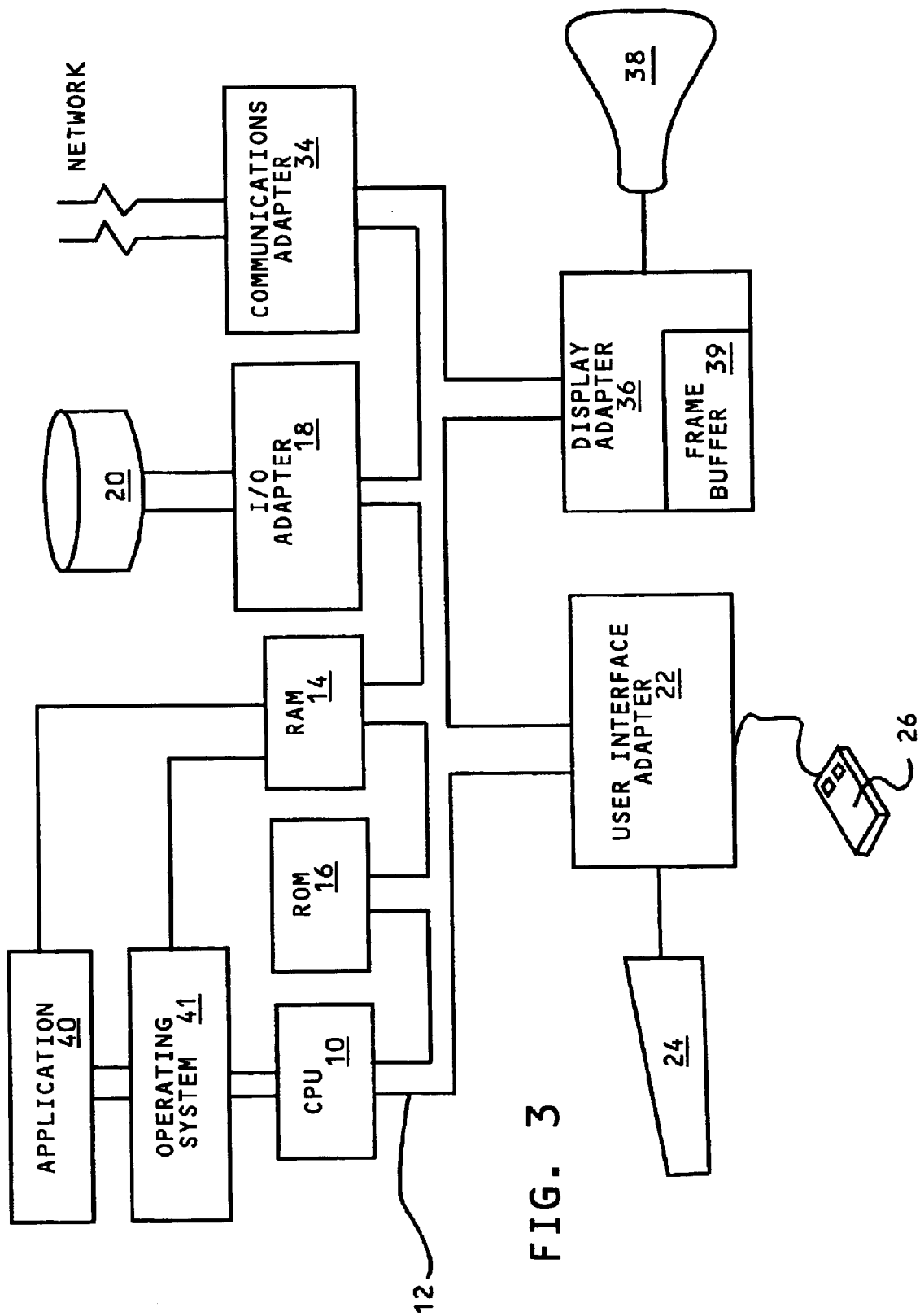
FIG. 3 is a block diagram of a data processing system including a central processing unit and network connections via a communications adapter which is capable of functioning as the display terminal and server of FIG. 2 on which the workflow process may be developed and managed as well as any of the receiving display stations used by the operators or participants to execute their assigned activities.

Referring to FIG. 3, a typical computer controlled display system is shown which may function as the computer controlled display terminals 62–64 (FIG. 2) or Internet stations used as any of the receiving stations for the participants executing activities. The system shown is also illustrative of any of the developers' workstations on which the workflow processes may be defined. The display system of FIG. 3 may also be used for the workflow management servers used in controlling the execution of assigned activities.

A central processing unit (CPU) 10, may be one of the commercial PC microprocessors; when the system shown is used by the workflow process editor or developer or as the server computer for managing the running or distribution of workflow activities to participants, then a workstation is preferably used, e.g. RISC System/6000™ (RS/6000) series available from International Business Machines Corporation (IBM). The CPU is interconnected to various other components by system bus 12. An operating system 41 runs on CPU 10, provides control and is used to coordinate the function of the various components of FIG. 3. Operating system 41 may be one of the commercially available operating systems such as the AIX 6000™ operating system available from IBM; Microsoft's Windows 98™ or Windows NT™, as well as UNIX and AIX operating systems. Application programs 40, controlled by the system, are moved into and out of the main memory Random Access Memory (RAM) 14. These programs include the programs of the present invention for controlling the allocation or designation of resources to participants or operators who are carrying out the assigned workflow activities requiring such resources. A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 may be a Small Computer System Interface (SCSI) adapter that communicates with the disk storage device 20. Communications adapter 34 interconnects bus 12 with an outside network enabling the computer system to communicate with other such computers over a Local Area Network (LAN) or through the Web or Internet. The latter two terms are meant to be generally interchangeable and are so used in the present description of the distribution network. I/O devices are also connected to system bus 12 via user interface adapter 22 and display adapter 36. Keyboard 24 and mouse 26 are all interconnected to bus 12 through user interface adapter 22. It is through such input devices that the workflow process developer at his workstation or participant/ operators at receiving display stations may interactively relate to the network in order to access assigned activities and the resources designated or permitted to the operator in the execution of such activities. Display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

Figure 4:
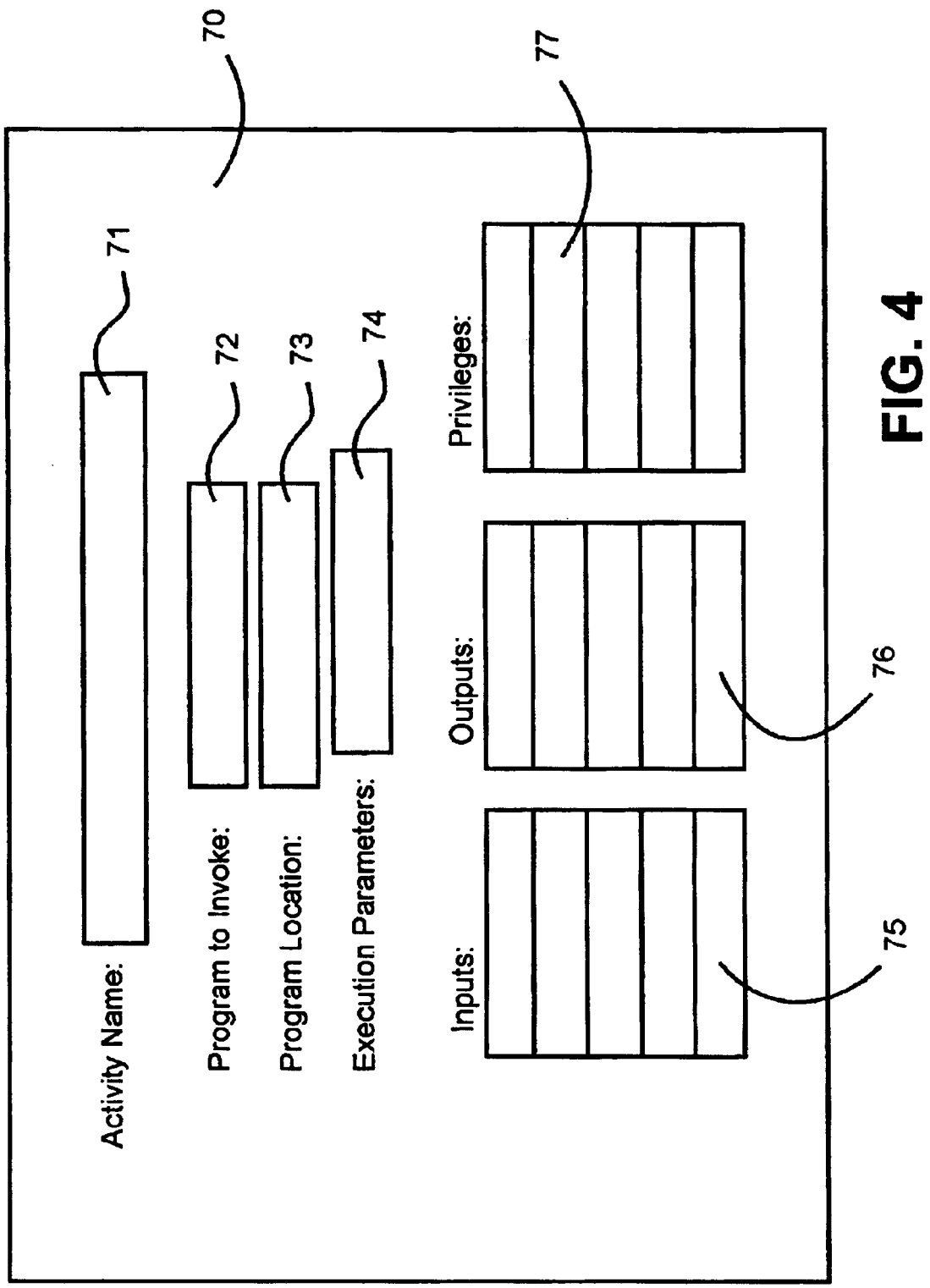
FIG. 4 is a diagram of an interactive display screen on which the developer of a workflow process may select activities and parameters and assign such activities to operators along with access to selected resources for the operator only during execution of the assigned activities.

FIG. 4 is a diagrammatic view of a display screen interface which is made available to the workflow process developer so that he may assign access to resources needed to complete assigned activities. The display interface 70 includes data entry fields 71 for identifying the activity, for invoking the program 72 to which the activity is directed and the program location 73, defined execution parameters 74, the inputs provided 75 and the desired outputs 76 which should result from the execution of the activity. In addition, the workflow process developer must, for each activity, predetermine what privileges 77, i.e. access to resources the operator or participant to whom the activity is assigned will need in order to execute the activity. These privileges are access to resources, most often proprietary databases or application programs. It is with respect to such resources that the present invention applies. As will be hereinafter set forth in greater detail, the participant only gets access during the period of time that he is executing the assigned activity.

FIGS. 5 through 8 are diagrammatic illustrations of the display screens which may be presented to the participants or operators executing assigned activities during the execution of such activities.

Figure 5:
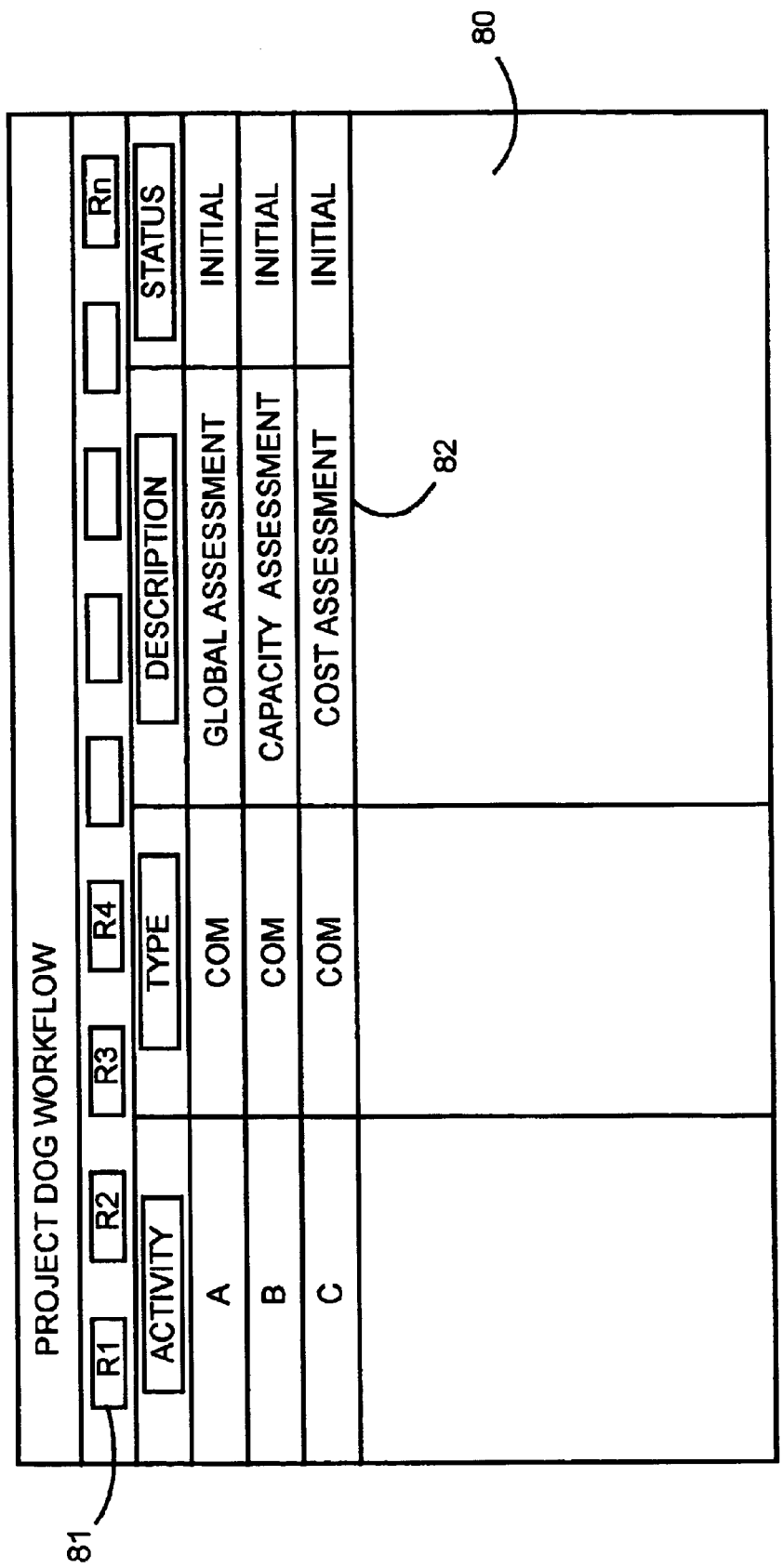
FIG. 5 is a diagram of an interactive display screen presented to an operator who has an assigned activity.
Figure 6:
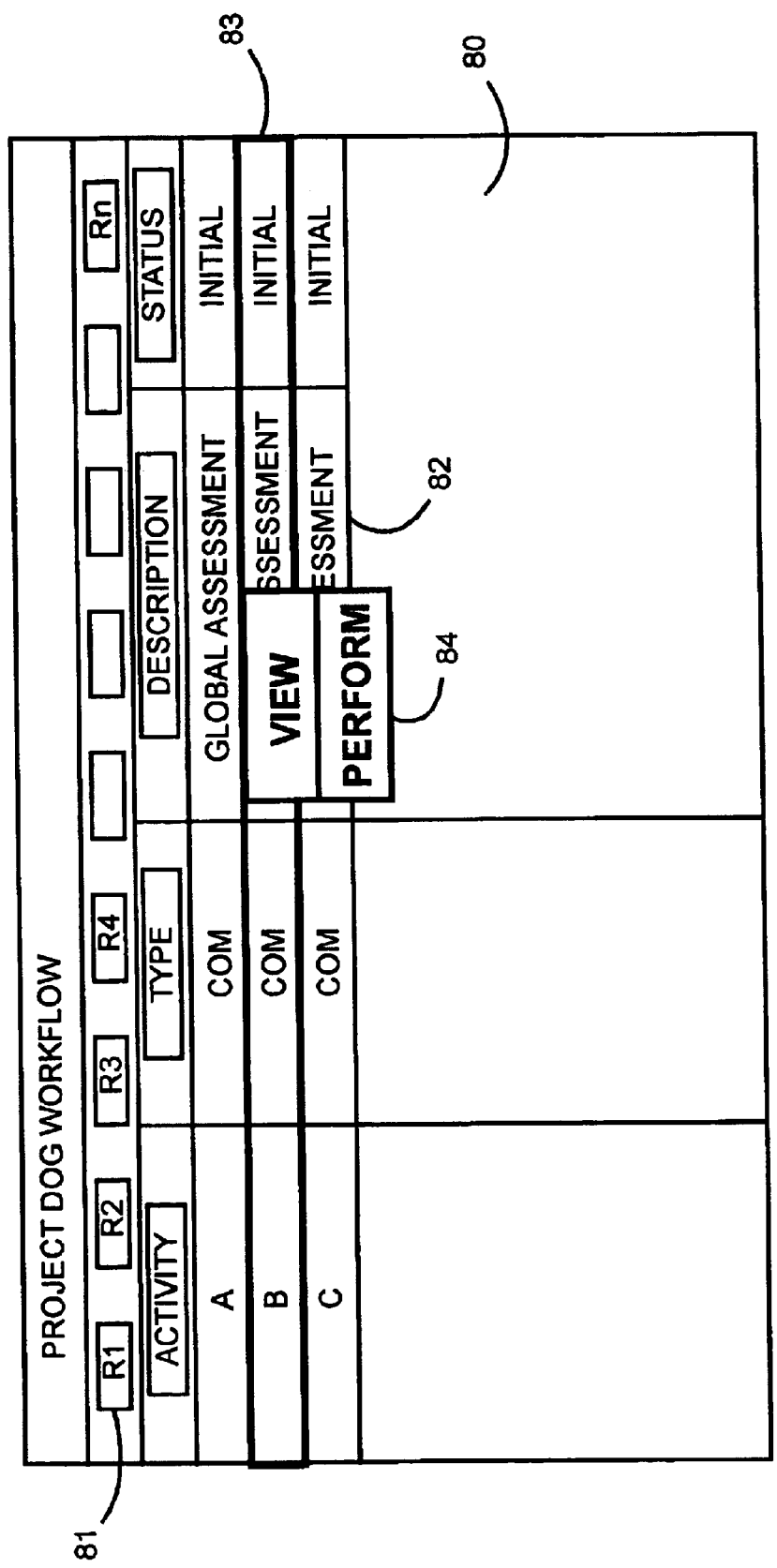
FIG. 6 is a diagram of the interactive display screen of FIG. 5 after the operator has selected one of his listed assigned activities.

FIG. 5 shows a simplified display interface 80 which could be presented to an operator on his receiving display, for a particular workflow process, he has been assigned, let us say three activities, A through C, to complete which are listed in list 82. Irrespective of the activities, the operator already has unlimited access to resources respectively represented by elements R1 through Rn in bar 81. In the next stage of the displayed process, FIG. 6, the operator has selected activity B, item 83 on list 82. Menu 84 pops up offering the operator the choice of viewing or commencing the performance, i.e. execution of activity B. When he selects perform, this results in the display screen of FIG. 7 where menu 85 appears with interactive elements 86–88, R-A, R-B and R-C which represent additional resources which the operator has interactive access to through this interface only during the execution of Activity B. There is also an element 89 through which the operator may request access to even further resources which he believes that he will need to complete Activity B. This function will be subsequently described in greater detail with respect to FIG. 11.

Figure 7:
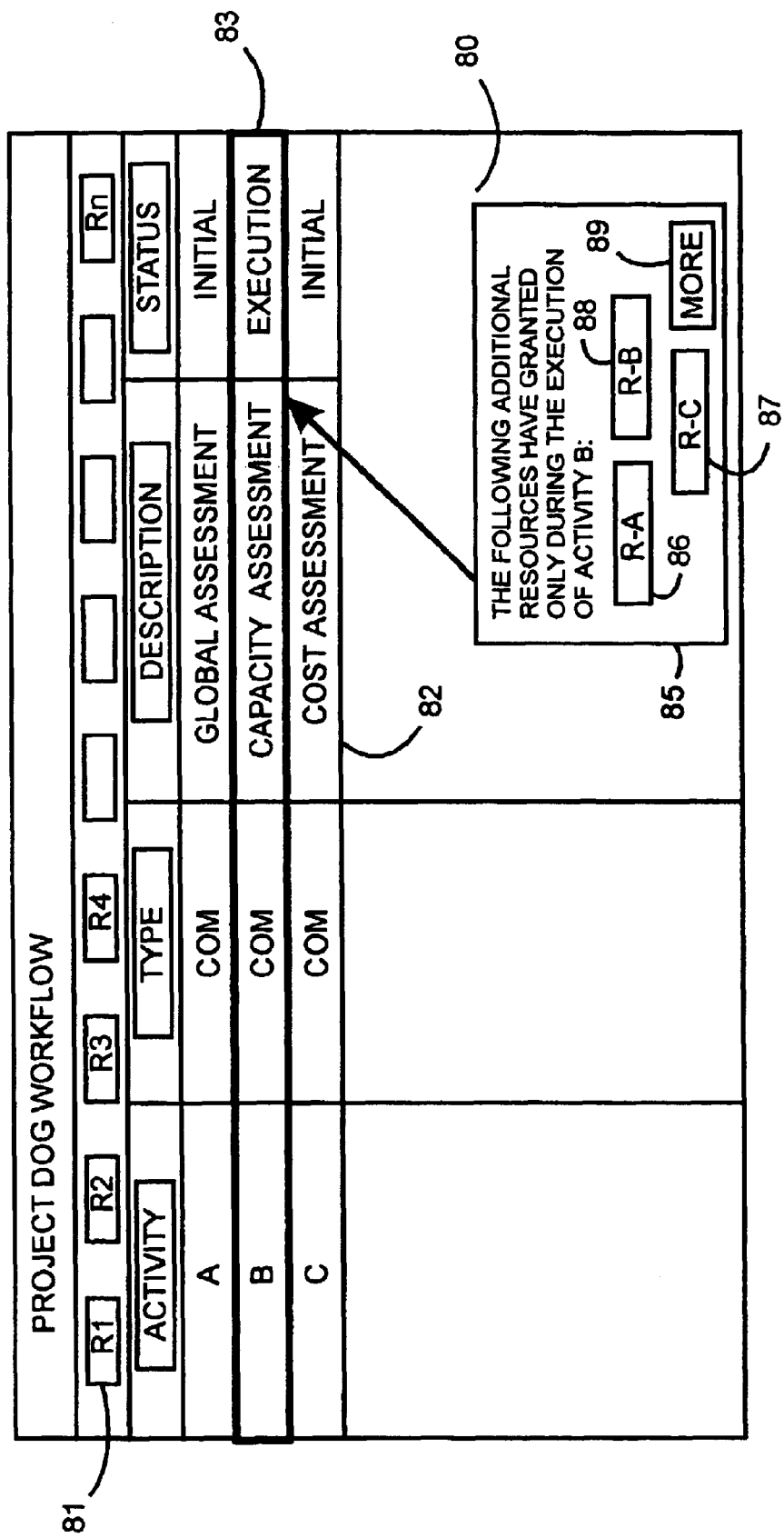
FIG. 7 is the display screen of FIG. 6, after the operator has selected to perform or execute one of the activities.

In any event, let us assume that the operator using the resources available to him through screen 80 in FIG. 7 and via a sequence of work display screens, not shown, completes the execution of Activity B, his display now returns to the display screen of FIG. 8 where Activity B is indicated as completed and resource menu 85 has been removed so that the operator no longer can access resources R-A, R-B and R-C.

Figure 9:
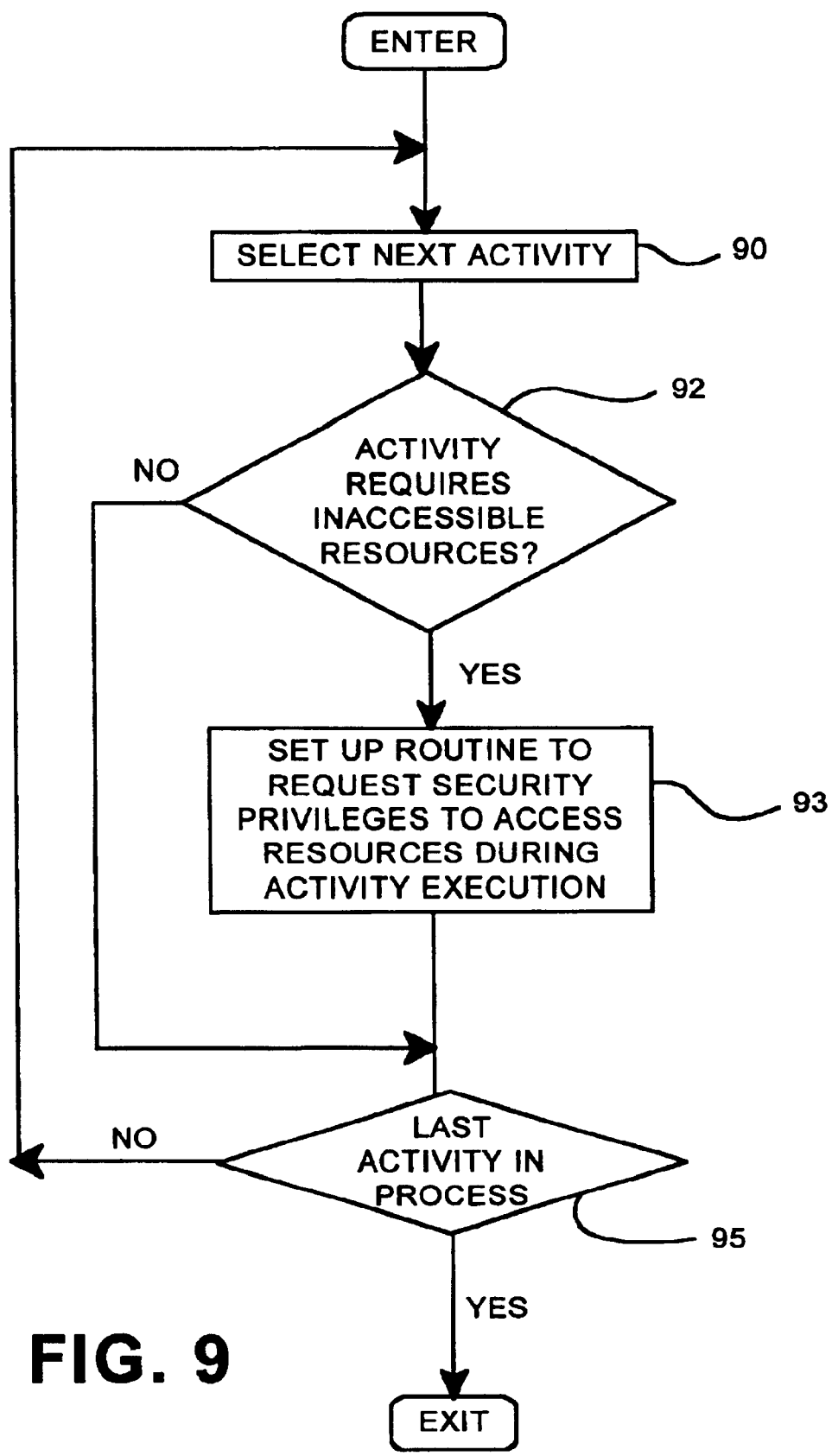
FIG. 9 is a flowchart of an illustrative run of the development and assignment of activities in workflow process according to the present invention.

With reference to the flowchart of FIG. 9, there will be described first an illustrative process of how the developer of a workflow process sets up the activities and their attendant resources in accordance with the present invention. The developer selects the next activity which is to be assigned, step 90, in the carrying out of the workflow process. A determination is then made as to whether the activity requires resources which would normally be inaccessible to the selected participant, step 92. If Yes, step 93, a routine is set up by the developer so that the security system used in the network on which the workflow is being carried will grant access, i.e. provide access privileges to the selected participant but only for the period of time during which the assigned activity is being executed by that participant. Any conventional security system usable for workflow processes may be implemented to provide security. Reference is made to pages 300–301 of the above-mentioned Production Workflow. Concepts and Techniques text for a discussion of applicable security management. In general, workflow processes may conveniently use the security systems available in the operating systems being used for the server and client computers in the network where the workflow is being distributed. When the assigned activity is sent to the participant, it will be accompanied by appropriate privileges, i.e. access to needed resources as described above during the carrying out of the workflow process, as will be hereinafter described with respect to FIG. 10. The data as to participant, activity and accessible resources may be stored in association with a network server in which the workflow management accumulates the data being developed and then manages the workflow through the distribution of activities for execution.

Next, or in the case that no inaccessible resources need to be designated, the flow goes to step 95 where a determination is then made as to whether the last activity in the process has been developed. If No, the flow is returned to step 90 where the next activity is selected. If Yes, the workflow development process is completed and exited.

Figure 10:
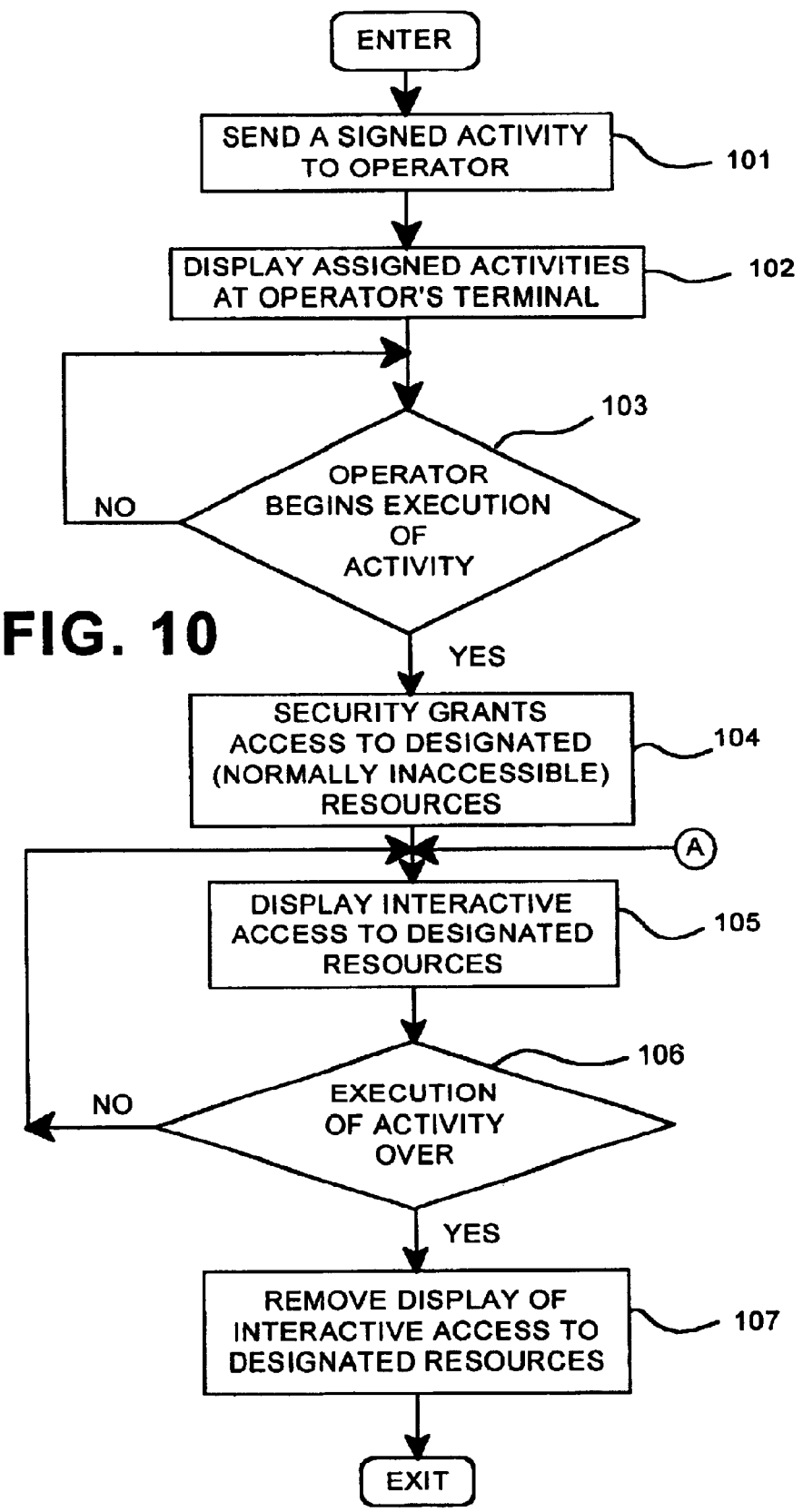
FIG. 10 is a flowchart of an illustrative run of the execution of an assigned activity in workflow process according to the present invention.

With respect to FIG. 10, there will now be described a running of an assigned activity. The activity is sent to the operator from the workflow process manager, step 101. The assigned activities are displayed at the operator's display terminal, step 102 (display of FIG. 5). Step 103 determines when the operator selects one of the activities (display of FIG. 6). Based upon the developer's set up, the system security grants access to the normally inaccessible resources needed to perform the activity, step 104. These needed resources are added to the operator's display interface, step 105 (display of FIG. 7). Since access to these designated resources is granted only during the execution of the assigned activity, the time of execution is monitored, step 106. When the execution is over, the display of the designated resources is removed, step 107 (display of FIG. 8). Consequently, the operator has no interface through which he may access the resources, and the activity execution session for the selected activity is over.

Figure 11:
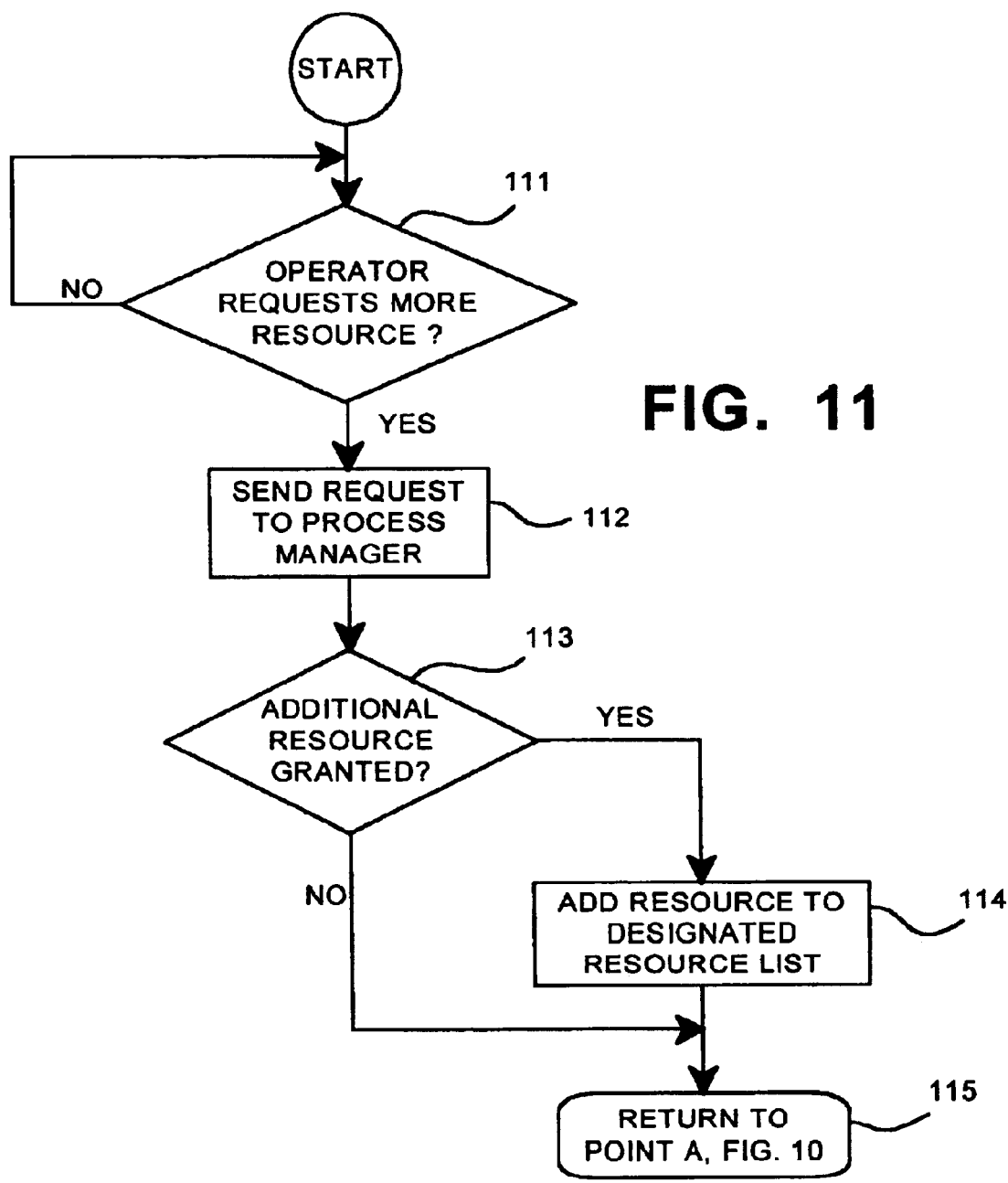
FIG. 11 is a flowchart of a routine in the present invention for increasing the resources designated to operators executing assigned activities.

It may happen in the execution of a particular activity, the operator may believe that he requires access to an additional resource in order to execute a selected activity. FIG. 11 illustrates a typical dialog which may occur between the operator and the workflow process manager to obtain the additional resource. When it is determined that the operator has requested an additional resource, step 111 (e.g. by pressing the More button 89, in display of FIG. 7), the request is sent to the process manager, step 112. At this point, a dialog between the operator and the workflow process manager may ensue, the details of which are not pertinent to the description of the present invention. If it is determined, step 113, that access to the additional resource should be granted, then, step 114, the additional resource is added to the interactive representations of available resources in menu 85, FIG. 7. At this point, or if the additional resource is not granted, the process is returned to point A, FIG. 10, step 115, and the execution of the activity is continued.

A convenient implementation of the present invention is in an application program 40 made up of programming steps or instructions resident in RAM 14, FIG. 3, of the process management server computers during various operations. Until required by the computer system, the program instructions may be stored in another readable medium, e.g. in disk drive 20, or in a removable memory such as an optical disk for use in a CD ROM computer input, or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. A system for providing to each of a plurality of operators having assigned activities in an overall workflow distribution, limited access to computer resources needed to respectively complete each activity through a computer controlled interactive display interface comprising:

means for displaying to each of a plurality of operators, a general set of elements, each representing a computer resource accessible to all of said operators;

means for respectively assigning activities to each of a said plurality of operators;

means for designating for each of said activities, at least one computer resource necessary to respectively complete each of said activities;

means for displaying to each of said operators, a designated set of elements, each representing a designated computer resource accessible to said operator to carry out said assigned activity;

means for determining the completion of each of said assigned activities; and means responsive to said determining means for removing from the display means only the elements representing the designated computer resources for each respective activity responsive to a determination that said respective activity as completed.

2. The system of claim 1 wherein said means for displaying, display said designated set of elements as menu elements, interactively selectable to thereby access the resources respectively represented by said elements.

3. The system of claim 2 further including:

display means permitting the operator to request access to an additional computer resource prior to the completion of an assigned activity, and means for designating said additional access by adding an element representative of said additional resource to said designated set of elements.

4. A system for providing to each of a plurality of operators having assigned activities in an overall workflow distribution over a network, limited access to computer resources needed to respectively complete each activity through a computer controlled interactive display interface comprising:

means for displaying to each of a plurality of operators, a general set of elements, each representing a computer resource accessible to all of said operators;

means for respectively assigning activities to each of said plurality of operators;

means for designating for each of said activities, at least one computer resource necessary to respectively complete each of said activities;

means for displaying to each of said operators on computer controlled display interfaces at receiving display stations on said network, a designated set of elements, each representing a designated computer resource accessible to said operator to carry out said assigned activity;

means for determining the completion of each of said assigned activities; and means responsive to said determining means for removing from the display means only the elements representing the designated computer resources for each respective activity responsive to a determination that said respective activity is completed.

5. The system of claim 4 further including:

display means permitting the operator to request access to an additional computer resource prior to the completion of an assigned activity, and means for designating sold additional access by adding element representative of said additional resource to said designated set of elements.

6. A method for providing to each of a plurality of operators having assigned activities in an overall workflow distribution process, limited access to computer resources needed to respectively complete each activity through a computer controlled interactive display interface comprising:

displaying to each of a plurality of operators, a general set of elements, each representing a computer resource accessible to all of said operators;

respectively assigning activities to each of said plurality of operators;

designating for each of said activities, at least one computer resource necessary to respectively complete each of said activities;

displaying to each or said operators, a designated set of elements, each representing a designated computer resource accessible to said operator to carry out said assigned activity;

determining the completion of each of said assigned activities; and removing from the display means only the elements representing the designated computer resources for each respective activity responsive to a determination that said respective activity is completed.

7. The method of claim 6 wherein said designated set of elements are displayed as menu elements, interactively selectable to thereby access the resources respectively represented by said elements.

8. The method of claim 7 further including the steps of;

permitting the operator to request access to an additional computer resource prior to the completion of an assigned activity, and designating said additional access by adding an element representative of said additional resource to said designated set of elements.

9. A method for providing to each of a plurality of operators having assigned activities in an overall workflow distribution over a network, limited access to computer resources needed to respectively complete each activity through a computer controlled interactive display interface comprising:

displaying to each a plurality of operators, a general set of elements, each representing a computer resource accessible to all of said operators;

respectively assigning activities to each of a said plurality of operators;

designating for each of said activities, at least one computer resource necessary to respectively complete each of said activities;

displaying to each of said operators on computer controlled display interfaces at receiving display stations on the network, a designated set of elements, each representing a designated computer resource accessible to said operator to carry out said assigned activity;

determining the completion of each of said assigned activities; and removing from the display, only the elements representing the designated computer resources for each respective activity responsive to a determination that said respective activity is completed.

10. The method of claim 9 further including the steps of:

permitting the operator to request access to an additional computer resource prior to the completion of an assigned activity, and designating said additional access by adding an element representative of said additional resource to said designated set of elements.

11. A computer program having program code included on a computer readable medium operable in a process for providing to each of a plurality of operators having assigned activities in an overall workflow distribution, limited access to computer resources heeded to respectively complete each activity through a computer controlled interactive display interface comprising:

means for displaying to each of a plurality of operators, a general set of elements, each representing a computer resource accessible to all of said operators;

means for respectively assigning activities to each of plurality of operators;

means for designating for each of said activities, at least one computer resource necessary to respectively complete, each of said activities;

means for displaying to each of said operators, a designated set of elements, each representing a designated computer resource accessible to said operator to carry out said assigned activity;

means for determining the completion of each of said assigned activities; and means responsive to said determining means for removing from the display means only the elements representing the designated computer resources for each respective activity responsive to a determination that said respective activity is completed.

12. The computer program of claim 11 wherein said means for displaying display said designated set of elements as menu elements, interactively selectable to thereby access the resources respectively represented by said elements.

13. The computer program of claim 12 further including:

display means permitting the operator to request access to an additional computer resource prior to the completion of an assigned activity, and means for designating said additional access by adding an element representative of said additional resource to said designated set of elements.

14. A computer program having program code included on a computer readable medium operable in a process for providing to each of a plurality of operators having assigned activities in an overall workflow distribution over a network, limited access to computer resources needed to respectively complete each activity through a computer controlled interactive display interface comprising:

means for displaying to each of a plurality of operators, a general set of elements, each representing a computer resource accessible to all of said operators;

means for respectively assigning activities to each of said plurality of operators;

means for designating for each of said activities, at least one computer resource necessary to respectively complete each of said activities;

means for displaying to each of said operators on computer controlled display interfaces at receiving display stations on said network, a designated set of elements, each representing a designated computer resource accessible to said operator to carry out said assigned activity;

means for determining the completion of each of said assigned activities; and means responsive to said determining means for removing from the display means only the elements representing the designated computer resources for each respective activity responsive to a determination that said respective activity completed.

15. The computer program of claim 14, further including:

display means permitting the operator to request access to an additional computer resource prior to the completion of an assigned activity, and means for designating said additional access by adding an element representative of said additional resource to said designated set of elements.

* * * * *